United States Patent
Jeon et al.

(10) Patent No.: US 11,640,321 B2
(45) Date of Patent: May 2, 2023

(54) METHOD AND APPARATUS FOR MEMORY ALLOCATION IN A MULTI-CORE PROCESSOR SYSTEM, AND RECORDING MEDIUM THEREFOR

(71) Applicant: Research & Business Foundation Sungkyunkwan University, Suwon-si (KR)

(72) Inventors: Jaewook Jeon, Suwon-si (KR); Junyoung Moon, Suwon-si (KR); Doyeon Kim, Suwon-si (KR); Minhee Jo, Suwon-si (KR); Jaewan Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 1 day.

(21) Appl. No.: 16/997,160

(22) Filed: Aug. 19, 2020

(65) Prior Publication Data

US 2021/0055967 A1    Feb. 25, 2021

(30) Foreign Application Priority Data

Aug. 19, 2019  (KR) .................. 10-2019-0101332
Aug. 19, 2019  (KR) .................. 10-2019-0101333

(51) Int. Cl.
| | |
|---|---|
| G06F 9/50 | (2006.01) |
| G06F 9/54 | (2006.01) |
| G06F 15/80 | (2006.01) |
| G06F 12/0842 | (2016.01) |
| G06F 12/084 | (2016.01) |

(52) U.S. Cl.
CPC ............ *G06F 9/5016* (2013.01); *G06F 9/544* (2013.01); *G06F 12/084* (2013.01); *G06F 12/0842* (2013.01); *G06F 15/80* (2013.01)

(58) Field of Classification Search
CPC .... G06F 9/5016; G06F 9/544; G06F 12/0813; G06F 12/084; G06F 12/0842; G06F 15/80
See application file for complete search history.

(56) References Cited

U.S. PATENT DOCUMENTS

| | | | | |
|---|---|---|---|---|
| 2009/0077403 | A1* | 3/2009 | Hayashi | ................. G06F 12/08 713/320 |
| 2013/0111138 | A1* | 5/2013 | Suzuki | ................. G06F 12/084 711/122 |

FOREIGN PATENT DOCUMENTS

| | | |
|---|---|---|
| JP | 2011-141703 A | 7/2011 |
| JP | JR 5440702 B2 | 3/2014 |
| KR | 10-2009-0082781 A | 7/2009 |
| KR | 10-2010-0069302 A | 6/2010 |

(Continued)

*Primary Examiner* — Aracelis Ruiz
(74) *Attorney, Agent, or Firm* — NSIP Law

(57) ABSTRACT

According to the disclosure, a memory allocation method and device and recording medium in a multi-core processor system are disclosed. According to an embodiment, a method for allocating a shared variable to a memory in a multi-core processor system comprises mapping each task to a core, allocating unshared variables to memories times of access, to which are sequentially minimized, in descending order of actual variable access count, calculating an actual variable access count per core, selecting a core with a highest actual variable access count, and allocating a shared variable to a memory of the selected core.

8 Claims, 9 Drawing Sheets

(56) References Cited

FOREIGN PATENT DOCUMENTS

| KR | 10-2013-0068685 A | 6/2013 |
| KR | 10-2016-0046223 A | 4/2016 |

\* cited by examiner

[FIG. 1]
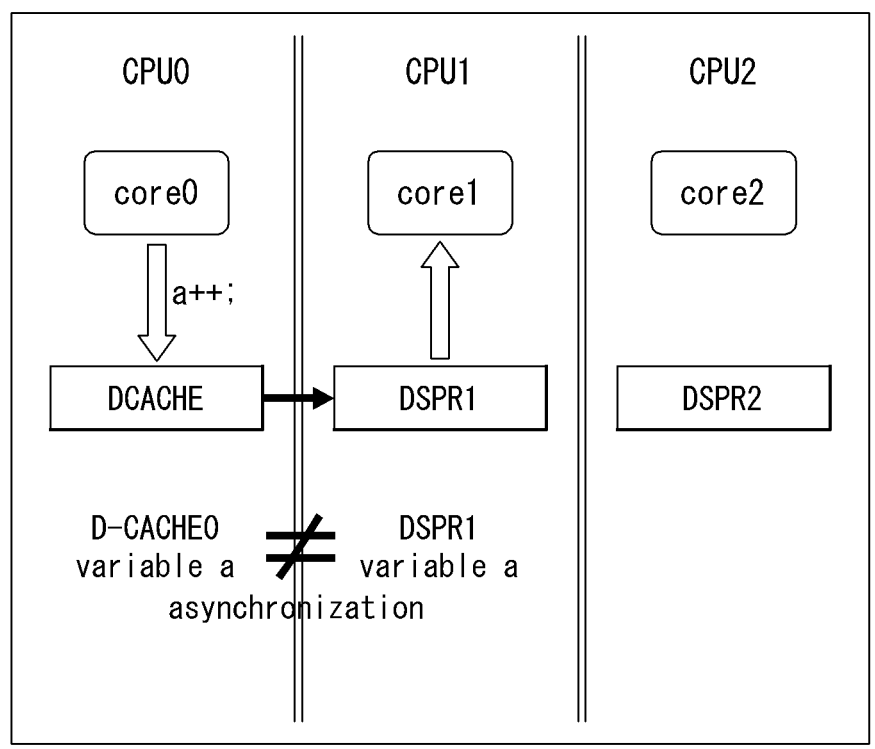

[FIG. 2]
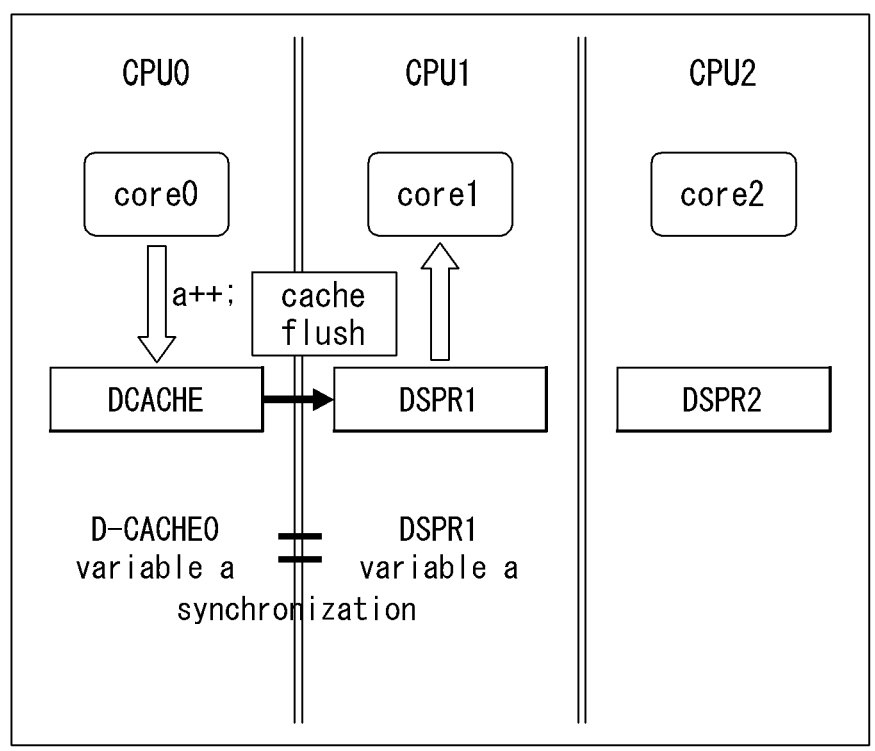

[FIG. 3]
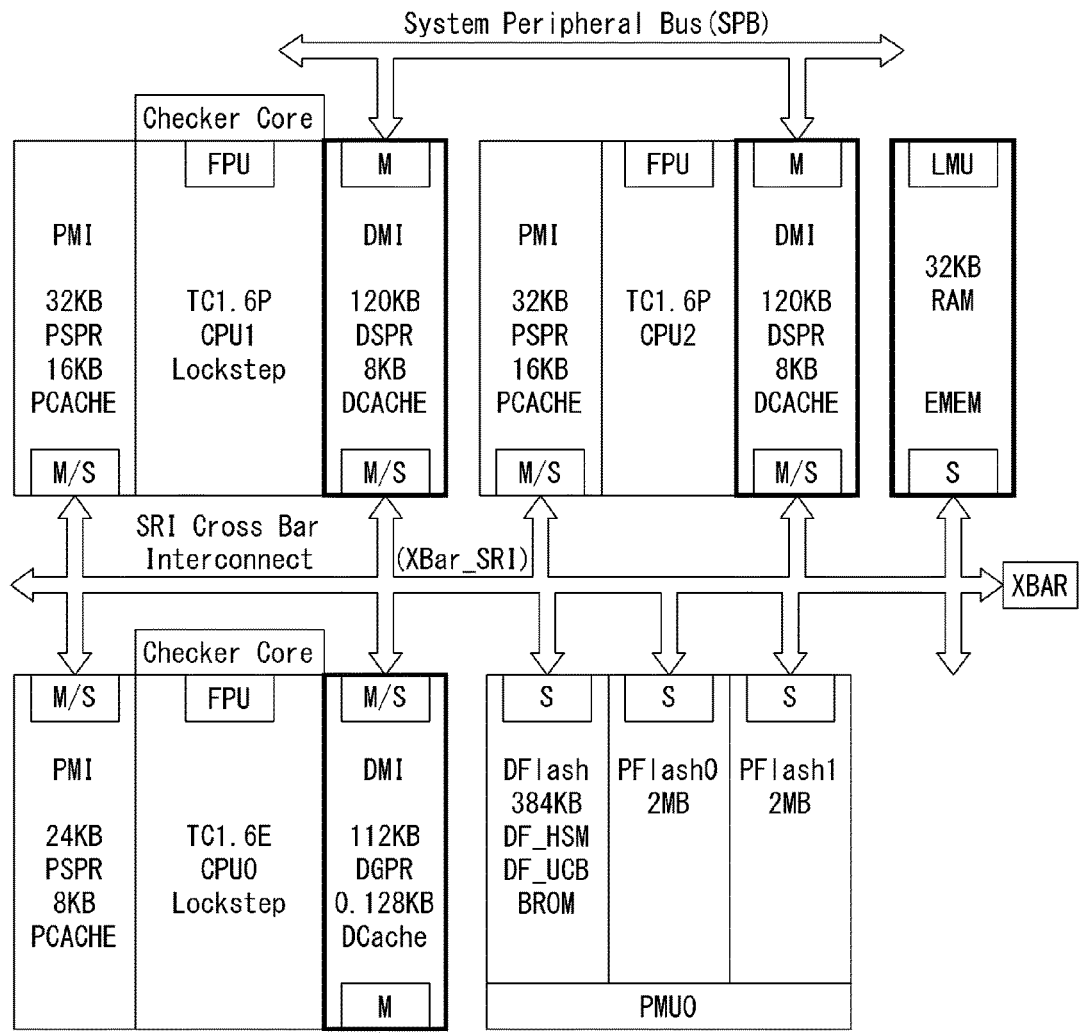

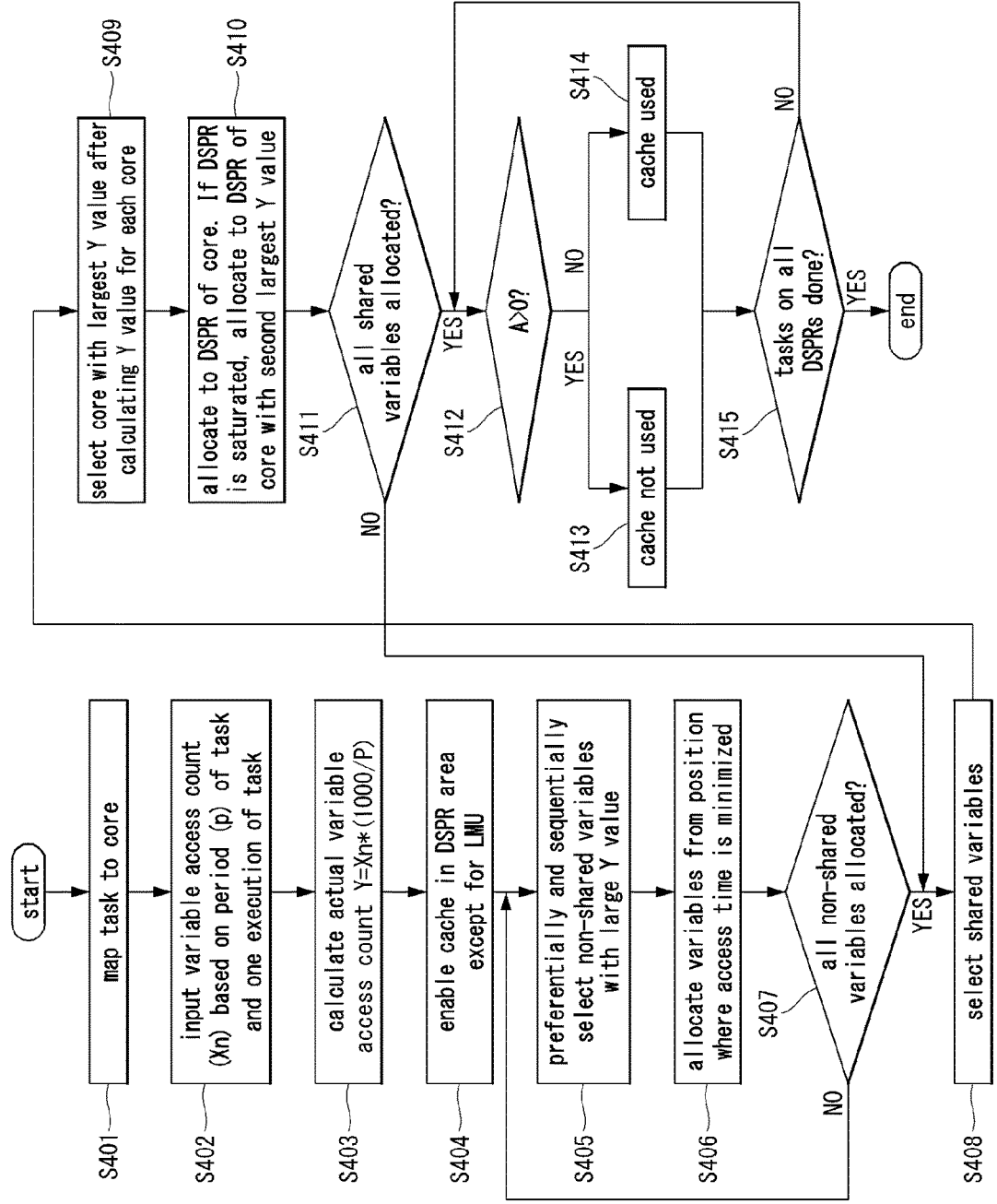
[FIG. 4]

[FIG. 5]
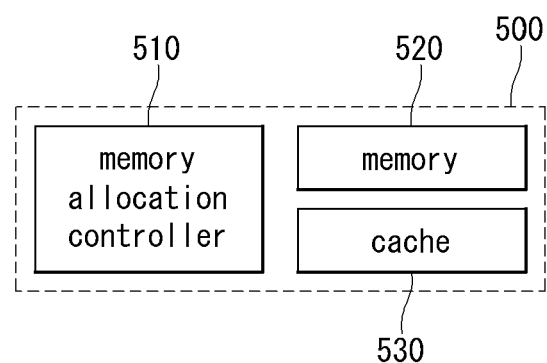

[FIG. 6]
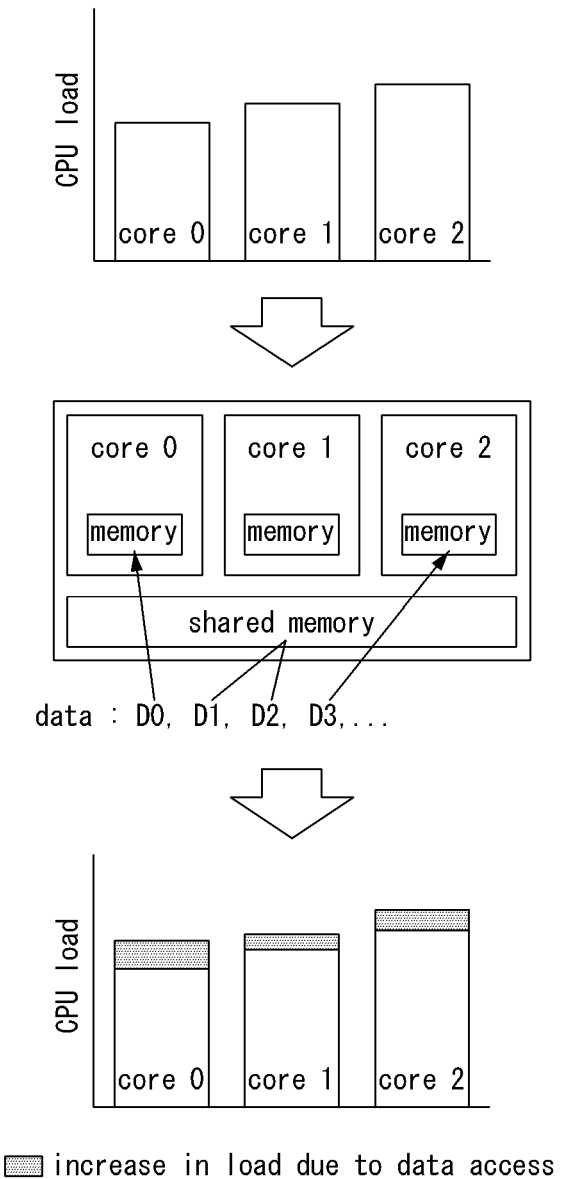

[FIG. 7]
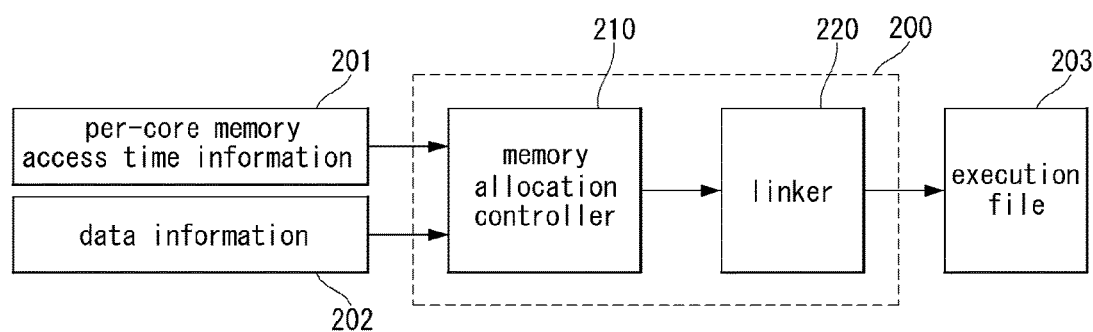

[FIG. 8]
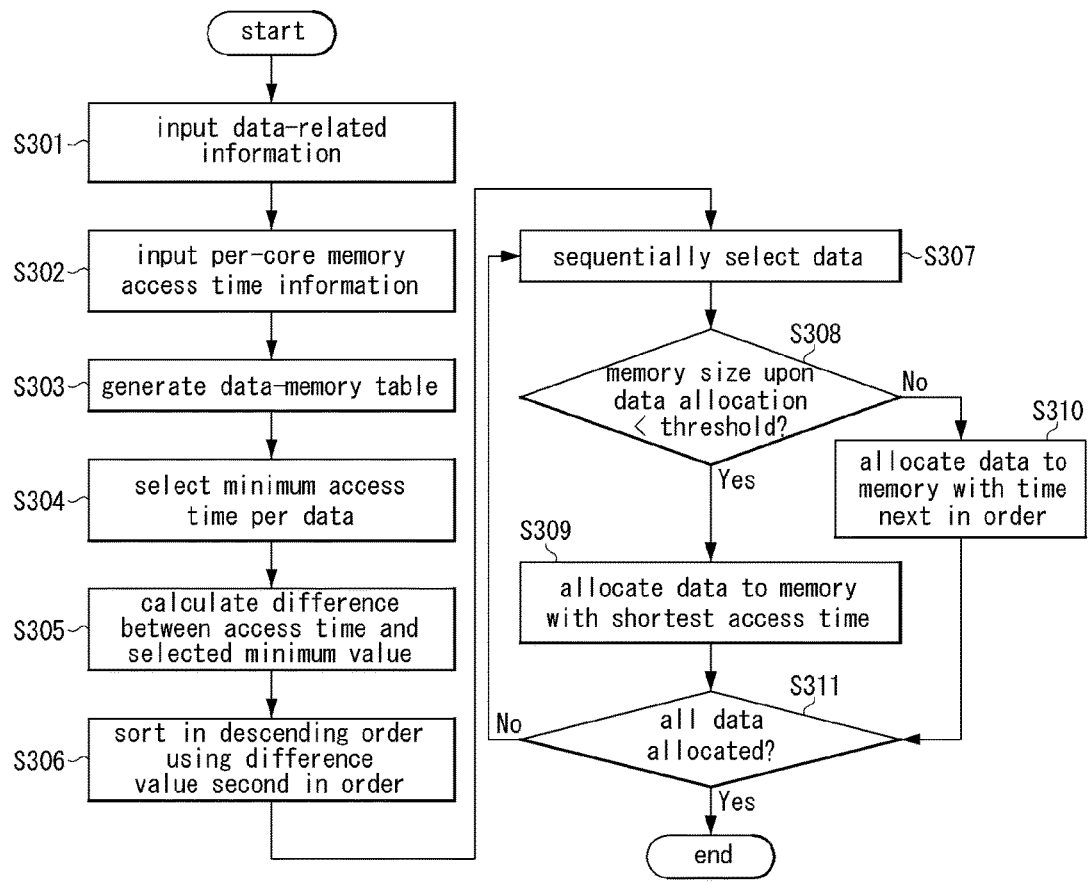

[FIG. 9]
|    | C0 | C1 |
|----|----|----|
| D1 | 22 | 12 |
| D2 | 20 | 25 |
| D3 | 10 | 6  |
[chart 1] per-core data access count
|    | M1 | M2 | M3 |
|----|----|----|----|
| C0 | 10 | 20 | 25 |
| C1 | 20 | 10 | 25 |
[chart 2] per-core data access time
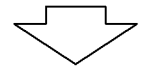
|    | M1      | M2       | M3        |
|----|---------|----------|-----------|
| D1 | 460 (0) | 560 (100)| 850 (390) |
| D2 | 700 (50)| 650 (0)  | 1125 (475)|
| D3 | 220 (0) | 260 (40) | 400 (180) |
[chart 3] data-memory table
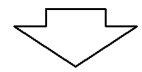
| M1    | M2    | M3 |
|-------|-------|----|
| D1-M1 | D2-M2 |    |
| D3-M1 |       |    |
[chart 4] sort in descending order for each memory % METHOD AND APPARATUS FOR MEMORY ALLOCATION IN A MULTI-CORE PROCESSOR SYSTEM, AND RECORDING MEDIUM THEREFOR

CROSS-REFERENCE TO RELATED APPLICATIONS

This application claims the priority benefit of Korean Patent Application No. 10-2019-0101332 filed on Aug. 19, 2019, and 10-2019-0101333 filed on Aug. 19, 2019 which is incorporated herein by reference for all purposes as if fully set forth herein.

BACKGROUND OF THE DISCLOSURE

Field of the Disclosure

Embodiments of the disclosure relates to a method and device for memory allocation in a multi-core processor, and a storage medium for the same, and more specifically, to a method and device for optimizing memory allocation while maintaining integrity for variables in a multi-core processor system and a storage medium for the same.

Discussion of the Related Art

There have been known devices and methods for securing data integrity via use shared data copying in data processing systems, in which an object code processor obtains information for shared data, and a linker allocates copied symbols of the shared data to a memory.

Despite securing data integrity by use of shared data copying, such conventional methods and devices lack a method for minimizing overhead for accessing the memory upon use of shared data copying and thus fails to give the optimized results for use of the core and memory.

To address such issues, a need exists for a method for minimizing the memory access time for each core by obtaining information for the task and core accessing each shared data.

SUMMARY OF THE DISCLOSURE

According to an embodiment, a method for allocating a shared variable to a memory in a multi-core processor system comprises mapping each task to a core, allocating unshared variables to memories times of access, to which are sequentially minimized, in descending order of actual variable access count, calculating an actual variable access count per core, selecting a core with a highest actual variable access count, and allocating a shared variable to a memory of the selected core.

According to an embodiment, a method for allocating shared data in a multi-core processor system comprises receiving data information and per-core memory access time information, generating a data-memory table by calculating per-core data access counts and per-core memory access times based on the data information and the per-core memory access time information, determining per-data item minimum memory access times based on the data-memory table, sorting differences between the determined minimum memory access times and the per-data item memory access times in descending order, and sequentially allocating data to memories in the sorted order.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings, FIG. 1 is a view illustrating an example of occurrence of an integrity issue when cache flush applies;

FIG. 2 is a view illustrating an example of addressing an integrity issue when cache flush applies;

FIG. 3 is a view illustrating a non-uniform memory access (NUMA)-type memory structure according to an embodiment of the disclosure;

FIG. 4 is a view illustrating a method for memory allocation to minimize an access time of a shared variable in a multi-core processor system according to an embodiment of the disclosure;

FIG. 5 is a view illustrating a device for memory allocation to minimize an access time of a shared variable in a multi-core processor system according to an embodiment of the disclosure;

FIG. 6 illustrates an example of memory allocation of data upon multi-core migration;

FIG. 7 is a view illustrating a memory allocation device of shared data in a multi-core processor system according to an embodiment of the disclosure;

FIG. 8 is a view illustrating a memory allocation optimization method of shared data in a multi-core processor system according to an embodiment of the disclosure; and FIG. 9 is a view illustrating a memory allocation optimization method of shared data in a multi-core processor system according to an embodiment of the disclosure.

DETAILED DESCRIPTION OF THE EMBODIMENTS

Reference will now be made in detail to embodiments of the disclosure, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the disclosure.

FIG. 1 is a view illustrating an example of occurrence of an integrity issue when cache flush applies.

In general, use of a data cache (DCACHE) significantly reduces memory access time. For the shared variable (variable a in FIG. 1) commonly used for each core, if no flush code is inserted upon allocation to data scratch-pad random access memory (DSPR), the value written to the DCACHE is not immediately updated. Thus, although each core reads the same value, they end up having different values. Resultantly, the integrity issue shown in FIG. 1 arises.

FIG. 2 is a view illustrating an example of addressing an integrity issue when cache flush applies.

To address the above-mentioned integrity issue, if a shared variable (variable a in FIG. 2) is allocated to the DSPR upon using the cache, a flush code is inevitably needed and, thus, consideration is required to add the time for performing the flush code to the memory access time as shown in FIG. 2.

Since normal local variables, other than the shared variable, are not used by the other cores, no problem occurs although they are allocated to the DSPR.

Hence, for allocation for the shared variable, it is efficient to compare a circumstance of using the cache, with the flush time considered, and another circumstance of using the cache without using the flush and use the memory.

Accordingly, the disclosure proposes a method for optimizing the memory access time of a task through the use of a memory (for example, DSPR) and a cache having fast performance for variables used in software.

FIG. 3 is a view illustrating a non-uniform memory access (NUMA)-type memory structure according to an embodiment of the disclosure.

The terms used in FIG. 3 are as follows:
PCACHE: Program Cache
DCACHE: Data Cache
DSPR: Data Scratch-Pad RAM
PSPR: Program Scratch-Pad RAM
BROM: Boot ROM (Read-Only Memory)
PFlash: Program Flash
DFlash: Data Flash, i.e., EEPROM (Electrically Erasable Programmable Read-Only Memory)
S: SRI (SRI(Shared Resource Interconnect) Slave Interface)
M: SRI Master Interface
DMI: Direct Media Interface
SPB: System Peripheral Bus
XBAR_SRI: SRI Cross Bar Interconnect However, this is merely an example memory structure to which the disclosure is applicable, and the disclosure is not limited thereto.

FIG. 4 is a view illustrating a method for memory allocation to minimize an access time of a shared variable in a multi-core processor system according to an embodiment of the disclosure.

Referring to FIG. 4, a memory allocation device evenly maps (allocates) a task to cores (S401).

The memory allocation device determines (i.e., receives) a variable access count (X_n) based on the period P of the task and one execution of the task (S402).

The memory allocation device calculates the actual variable access count (S403).

The actual variable count is calculated as shown in Equation 1 below.

$$Y = X_n \times (1000/P) \quad \text{[Equation 1]}$$

where Y is the actual variable access count, X_n is the variable access count when the task is performed once, and P is the period of the task.

The actual variable access count may be obtained by multiplying the determined (i.e., received) variable access count by 1000 followed by dividing the result by the task period. At this time, the reason for multiplying by 1000 and then dividing by the task period is to match the operation count of a different task to the task with the largest period, 1000 ms.

For example, since the 1000 ms task is executed once, the 1 ms task is executed 1000 times, it is preferable to multiply by 1000 (1000/1 ms period) for the variables operated within 1 ms.

The memory allocation device enables the cache in the memory (e.g., DSPR) area except for the local memory unit (LMU) (S404).

The memory allocation device preferentially selects the variables not shared by each core (i.e., non-shared variables) and allocate the variables from the position where the access time is minimized.

That is, the memory allocation device preferentially selects non-shared variables with a high Y value and selects them sequentially (i.e., in order of high Y value) (S405).

The memory allocation device allocates the non-shared variables from the position (i.e., memory) where the access time is minimized (S406).

The memory allocation device determines whether memory allocation has been done for all the non-shared variables (S407).

Unless memory allocation for all the non-shared variables is done, the memory allocation device returns to step S405 and repeats steps S405 to S407 until memory allocation for all the non-shared variables is done.

If memory allocation for all the non-shared variables is completed, the memory allocation device starts allocations of shared variables.

First, the memory allocation device selects shared variables (S408).

The memory allocation device calculates the Y value for each core according to Equation 1 above and selects the core with the largest Y value (S409).

The memory allocation device allocates (places) the selected shared variable to the memory (e.g., DSPR) of the core (i.e., the core with the largest Y value). At this time, if the memory (e.g., DSPR) of the core is saturated, the memory allocation device allocates (places) the selected shared variable to the memory (e.g., DSPR) of the core with the second largest Y value (S410).

The memory allocation device determines whether memory allocation for all the shared variables are completed (S411).

Unless memory allocation for all the shared variables is done, the memory allocation device returns to step S408 and repeats steps S408 to S411 until memory allocation for all the shared variables is done.

After memory allocation for all the shared variables is done, the memory allocation device calculates A (i.e., the difference in total memory access time depending on whether the cache is used) according to Equation 2 below and determines whether A is larger than 0 (S412).

A shows comparison between the total memory access time considering the flush overhead when the shared variables corresponding to all the tasks are allocated to the memory (e.g., DSPR) and the total memory access time when they are allocated to the memory (e.g., DSPR) without using the cache.

$$A = \sum_{P=T_1}^{T_n} \frac{1000}{P} \{(t_{dw} + t_{dr} + t_f) - (t_{lw} t_{lr})\}. \quad \text{[Equation 2]}$$

In Equation 2, t_dw denotes the total access time during which each shared variable is written to the cache memory. t_dr denotes the total access time during which each shared variable is read from the cache memory. t_lw denotes the total access time during which each shared variable is written to the random access memory (RAM). t_lr denotes the total access time during which each shared variable is read from the RAM. t_f denotes the execution time of the cache flush instruction. T_1 to T_n denote the periods of all the tasks.

If A is larger than 0, it is determined that non-use of the cache presents better efficiency and, thus, the memory allocation device does not use the cache (S413).

In contrast, if A is identical to or smaller than 0, the memory allocation device maintains it, as it is, in the memory (e.g., DSPR) and dispose it to use the cache and flush (S414).

The memory allocation device determines whether tasks on all the memories (e.g., DSPRs) have been completed (S415).

Unless the tasks on all the memories (e.g., DSPRs) are done, the memory allocation device returns to step S412 and repeats steps S412 to S415 until the tasks on all the memories (e.g., DSPRs) are done.

FIG. 5 is a view illustrating a device for memory allocation to minimize an access time of a shared variable in a multi-core processor system according to an embodiment of the disclosure.

In the multi-core processor system shown in FIG. 5, according to an embodiment, a memory allocation device 500 for shared variables is shown with components functionally distinguished from one another, and any one or more of the components may be physically integrated or separated from one another.

Referring to FIG. 5, the memory allocation device 500 may include a memory allocation controller 510, a memory 520, and a cache 530.

The memory allocation controller 510 maps (allocates) the task to the core. The memory allocation controller 510 determines (i.e., receives) the variable access count X_n based on the period P of the task and one execution of the task and calculates the actual variable access count according to Equation 1 above.

The memory allocation controller 510 enables the cache in the memory (e.g., DSPR) area except for the local memory unit (LMU).

The memory allocation controller 510 preferentially selects the variables not shared by each core (i.e., non-shared variables) and allocate the variables from the position where the access time is minimized. That is, the memory allocation controller 510 preferentially selects non-shared variables with a high Y value and selects them sequentially (i.e., in order of high Y value). The memory allocation controller 510 allocates the non-shared variables from the position (i.e., memory) where the access time is minimized.

The memory allocation controller 510 determines whether memory allocation for all the non-shared variables are done and repeats the above steps until memory allocation for all the non-shared variables is done.

If memory allocation for all the non-shared variables is completed, the memory allocation device starts allocations of shared variables.

First, the memory allocation controller 510 selects shared variables.

The memory allocation controller 510 calculates the Y value for each core according to Equation 1 above and selects the core with the largest Y value. The memory allocation controller 510 allocates (places) the selected shared variable to the memory (e.g., DSPR) of the core (i.e., the core with the largest Y value). At this time, if the memory (e.g., DSPR) of the core is saturated, the memory allocation controller 510 allocates (places) the selected shared variable to the memory (e.g., DSPR) of the core with the second largest Y value.

The memory allocation controller 510 determines whether memory allocation for all the shared variables are done and repeats the above steps until memory allocation for all the shared variables is done.

After memory allocation for all the shared variables is done, the memory allocation controller 510 calculates A (i.e., the difference in total memory access time depending on whether the cache is used) according to Equation 2 above and determines whether A is larger than 0.

If A is larger than 0, it is determined that non-use of the cache presents better efficiency and, thus, the memory allocation controller 510 does not use the cache. In contrast, if A is identical to or smaller than 0, the memory allocation controller 510 maintains it, as it is, in the memory (e.g., DSPR) and dispose it to use the cache and flush.

The memory allocation controller 510 determines whether the tasks on all the memories (e.g., DSPRs) are done and repeats the above steps until the tasks on all the memories (e.g., DSPRs) are done.

FIG. 6 illustrates data upon multi-core migration.

FIG. 6 illustrates example operations of a single core-based vehicular electronic control unit (ECU). Currently, single core-based ECUs are reaching the limit of core factor due to the limitations on computing power. Due to the high load factor of the core, it is difficult to apply a new control logic to the controller in the vehicle.

This leads vehicle developers to have more interest in vehicle multi-core technology and, to address the above issues, multi-core software is under development and research. Multicore-based ECUs may save core loads via parallelized execution of tasks and addresses the issues with application of a new control logic.

In developing such a vehicular multi-core system, it is critical to secure data integrity. However, upon securing data integrity by copying and using shared data, an access overhead may be caused depending on the position where the shared data is stored, increasing latency. The increased latency causes an increase in the load of each core.

The data processing system may be optimized by minimizing the increase in the load. Conventional technology, albeit presenting a method for securing data integrity, fails to propose a method for minimizing the overhead caused upon accessing the shared data for copy use and resultant latency and, thus, is not regarded as the most optimized system.

Upon copying and using shared data for securing integrity, it is possible to minimize the increases in core loads by minimizing the memory access time.

Therefore, to address the issues with the conventional technology, there is provided a device and method for minimizing the memory access time by storing shared data in a proper position upon copying and using the shared data for data integrity, according to the disclosure.

According to the disclosure, to resolve such issues, a semiconductor device memory allocation control device is proposed which receives information for shared data and sets a position for storing the shared data depending on the access time information corresponding to the storage position.

In other words, according to the disclosure, there is proposed a method for optimizing memory allocation for shared data in a multi-core processor system. To that end, there are proposed a memory allocation control device for shared data for optimizing memory allocation and a memory allocation algorithm for minimizing the data access overhead. The memory allocation control device generates a data-memory table by inputting the data access count per core and the memory access time per core. The memory allocation control device distributes proper shared data and optimizes memory use via the generated table and memory allocation algorithm.

There is provided a device and method for minimizing the memory access time by storing shared data in a proper position upon copying and using the shared data for data integrity, according to the disclosure. This is described below in detail with reference to the drawings.

FIG. 7 is a view illustrating a memory allocation device of shared data in a multi-core processor system according to an embodiment of the disclosure.

In the multi-core processor system shown in FIG. 7, according to an embodiment, a memory allocation device for shared data 200 is shown with components functionally distinguished from one another, and any one or more of the components may be physically integrated or separated from one another.

Referring to FIG. 7, the memory allocation device 200 may include a memory allocation controller 210 and a linker 220.

The memory allocation controller 210 generates the optimal memory storage position information (i.e., data-memory table) for each shared data.

More specifically, the memory allocation controller 210 receives a memory access time 201 and shared data information 202 for each core and calculates the total access time for each memory, thereby generating a data-memory table.

The memory access time information 201 for each core is data measured in an actual embedded system, and the shared data information 202 includes the period of the task accessing (associated with) each data and the core information to which the task is allocated.

The memory allocation controller 210 receives the per-core memory access time information 201 and the shared data information 202, calculates the per-core data access count and memory access time using the input information, and generates a memory-data table based on the results of calculation.

The memory allocation controller 210 determines the minimum memory access time for each data based on the memory-data table information. The memory allocation controller 210 calculates the difference between the selected minimum value and the memory access time for each data. The memory allocation controller 210 extracts the next minimum values from the results (i.e., the differences between the determined minimum value and the memory access time for each data) calculated for each data and sorts them in descending order.

The linker 220 generates an execution file 203 by allocating each shared data to the optimal memory position based on the memory-data table information generated by the memory allocation controller 210. In other words, each data is sequentially allocated to the memory in descending order.

At this time, the linker 220 may determine whether the size of memory is smaller than a threshold upon memory allocation for data. If the size of memory upon memory allocation for data is smaller than the memory threshold, the linker 220 may allocate the data to the memory with the shortest memory access time. In contrast, if the memory allocable data quantity is exceeded (i.e., when the memory size upon memory allocation for data is identical to or larger than the memory threshold), the linker 220 may allocate the data to the memory with the next shortest memory access time.

The linker 220 determines whether memory allocation has been done for all the data and, until memory allocation is done for all the data, may repeat the above-described steps.

FIG. 8 is a view illustrating a memory allocation optimization method of shared data in a multi-core processor system according to an embodiment of the disclosure.

FIG. 8 illustrates an example method of memory allocation to minimize data access overhead as proposed according to the disclosure.

Referring to FIG. 8, the memory allocation device receives data-related information (i.e., shared data information) (S301) and receives memory access time information for each core (S302).

The data-related information (i.e., shared data information) includes the period of the task accessing (associated with) each data and information for the core to which the task is allocated.

The memory allocation device calculates the per-core data access counts and memory allocation times using the received information and generates a data-memory table (S303).

The memory allocation device determines the minimum memory access time for each data using the generated table (S304) and calculates the difference between the selected minimum value and the memory access time for each data (S305).

The memory allocation device extracts the minimum value and next minimum values from the results calculated for each data (i.e., the differences between the determined minimum value and the memory access time for each data), sort them in descending order (S306), and sequentially allocates each data to the memory (S307).

At this time, the memory allocation device may determine whether the size of memory is smaller than a threshold upon memory allocation for data (S508).

If the size of memory upon memory allocation for data is smaller than the memory threshold, the memory allocation device may allocate the data to the memory with the shortest memory access time (S309).

In contrast, if the memory allocable data quantity is exceeded (i.e., when the memory size upon memory allocation for data is identical to or larger than the memory threshold), the memory allocation device may allocate the data to the memory with the next shortest memory access time (S310).

The memory allocation device determines whether memory allocation has been done for all the data (S311) and, until memory allocation is done for all the data, may repeat the above-described steps S307 to S310.

FIG. 9 is a view illustrating a memory allocation optimization method of shared data in a multi-core processor system according to an embodiment of the disclosure.

FIG. 9 illustrates an example of data allocation using per-core memory access time information and data information.

Table 1 of FIG. 9 shows the number of times in which each core accesses data, and Table 2 of FIG. 9 shows the time when each core accesses the memory.

The memory allocation controller may generate a data-memory table, as shown in Table 3 of FIG. 9, by regarding the two tables as matrixes and multiplying them by each other. The memory allocation controller may sequentially organize the data and memory information as shown in Table 4 of FIG. 9, by applying an algorithm, according to the disclosure, to the generated table. In Table 3 of FIG. 9, upon allocating shared data D1 to memory M1, an access time of 22*10+12*20=460 is given. The access count when each data is allocated to its respective memory is obtained as shown in Table 3 in the same manner. At this time, given the capacity limit to each memory, the priority for each data to be stored in the memory is obtained. First, in the example shown in Table 3, since D1 has the shortest access time when allocated to M1, the efficiency is the best. Likewise, the efficiency becomes the best when D2 is allocated to M2, and D3 to M1. At this time, it is good to allocate D1 and D3 to M1. However, the priority for the data to be stored in M1 is needed due to the capacity limit to memory. The method proposed in the disclosure gives priority considering the difference from the time when the data is allocated next in the order, outside the area where each data is to be stored first. As an example, when D1 is stored in M2, as the second position in the order, better efficiency may result. At this time, the total access time of 560 is taken, and time efficiency is reduced by 100 (560–460) as compared with when it is stored in M1. Likewise, when D3 is stored in M2, as the next position to M1 in the order, better efficiency may result. At this time, the total access time of 260 is taken, and time efficiency is reduced by 40 (260–220) as compared with when it is stored in M1. Given the reductions in time efficiency of 100 and 40, D1 has a larger reduction in time efficiency and, thus, a higher priority of allocation to M1 is given to D1 than D3. Sorting is performed in descending as shown in Table 4 by determining the order of allocation in the same manner.

Thereafter, the linker may allocate data to each memory using the information shown in Table 4 of FIG. 9. It is most advantageous in light of optimization to allocate data D1 of FIG. 9 to memory M1 of FIG. 9, and it may be expected that a system optimized for cores and memories may be designed by applying an embodiment of the disclosure.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for allocating a shared variable to a memory in a multi-core processor system, the method comprising:
allocating a task to cores;
determining a variable access count (Xn) based on a period (P) of the task when the task is performed once;
calculating an actual variable access count for each core using the determined variable access count (Xn) and the period (P) of the task;
allocating non-shared variables to a memory with a minimized access time in descending order of the actual variable access count;
selecting a core with a highest actual variable access count; and
allocating a shared variable to a memory of the selected core.

2. The method of claim 1, wherein when the memory of the selected core with the highest actual variable access count is saturated, the shared variable is allocated to a core with a second highest actual variable access count.

3. The method of claim 1, wherein the actual variable access count (Y) is calculated according to Equation 1:

$$Y = Xn \times (1000/P) \quad \text{[Equation 1]}.$$

4. The method of claim 1, further comprising:
determining whether A calculated according to Equation 2 below is larger than 0:

$$A = \sum_{P=T_1}^{T_n} \frac{1000}{P}((t_{dw} + t_{dr} + t_f) - (t_{lw}t_{lr})), \quad \text{[Equation 2]}$$

wherein t_dw is a total access time when each shared variable is written in a cache memory, t_dr is a total access time when each shared variable is read from the cache memory, t_lw is a total access time when each shared variable is written in a random-access memory (RAM), t_lr is a total access time when each shared variable is read from the RAM, t_f is a time of performing a cache flush instruction, and T_1 to T_n are periods of all tasks.

5. The method of claim 4, wherein when A is larger than 0, the shared variable is allocated to the memory without using a cache.

6. The method of claim 4, wherein when A is smaller than 0, the shared variable is allocated to the memory using a cache.

7. A device for allocating a shared variable to a memory in a multi-core processor system, the device comprising:
a memory;
a cache; and
a controller allocating a task to cores, calculating an actual variable access count for each core, allocating non-shared variables to a memory with a minimized access time in descending order of the actual variable access count, selecting a core with a highest actual variable access count, and allocating a shared variable to a memory of the selected core,
wherein when the memory of the selected core with the highest actual variable access count is saturated, the shared variable is allocated to a core with a second highest actual variable access count.

8. A non-transitory recording medium storing a program for allocating a shared variable to a memory in a multi-core processor system, the program comprising:
mapping each task to a core;
calculating an actual variable access count per core;

allocating non-shared variables to a memory with a minimized access time in descending order of the actual variable access count;
selecting a core with a highest actual variable access count; and
allocating a shared variable to a memory of the selected core,
wherein when the memory of the selected core with the highest actual variable access count is saturated, the shared variable is allocated to a core with a second highest actual variable access count.

\* \* \* \* \*